April 10, 1956

H. J. WOOD 2,741,421

SUPERCHARGER CONTROL SYSTEM

Filed April 27, 1951

HOMER J. WOOD,
INVENTOR.

BY

ATTORNEY

United States Patent Office 2,741,421
Patented Apr. 10, 1956

2,741,421

SUPERCHARGER CONTROL SYSTEM

Homer J. Wood, Sherman Oaks, Calif., assignor to The Garrett Corporation, Los Angeles, Calif., a corporation of California Application April 27, 1951, Serial No. 223,352

15 Claims. (Cl. 230—4)

This invention relates in general to means for driving superchargers such as employed in aircraft to supply air to a cabin or other enclosure, and relates in particular to a variable-ratio transmission for driving a supercharger from a variable speed power source such, for example, as one of the propelling engines of the aircraft.

It is an object of the invention to provide a system, including a variable speed transmission, for driving a supercharger, this system incorporating sensitive control means which regulates the variable speed transmission so as to apply power obtained from a variable speed power source in a manner to maintain prescribed conditions of air-flow and/or cabin air pressure. The invention is adapted for driving a device, such as a supercharger at controlled and relatively constant speed from a propelling engine of an aircraft having a large speed variation.

It is a further object of the invention to provide a system for driving a supercharger from a variable speed engine, this system having a plurality of variable ratio transmission units connected in series with the power output of the engine and the power input of the supercharger, one of these variable-ratio transmissions having control means responsive to the speed of the engine and another of the variable-ratio transmissions having a control which responds to a condition resulting from the speed of rotation of the operating parts of the supercharger, for example, flow or pressure of air delivered by the supercharger.

It is a further object of the invention to provide a system such as set forth in the foregoing paragraph wherein one of the series-related transmission is adjusted to high speed driving ratio when the engine is idling and is adjusted to low speed driving ratio when the engine is operating in its power delivery speed range, and another of the transmisions is regulated so that its driving speed ratio will be varied gradually in accordance with changes in speed required of the supercharger in order to achieve air delivery required for the pressurization and ventilation of the cabin or enclosure.

A further object of the invention is to provide a system for driving a supercharger from a variable speed engine, this system comprising variable ratio transmission means equipped with one control which is responsive to engine speed and another control which is responsive to a condition related to the air output of the supercharger. In this supercharger driving system ample air is delivered to the aircraft cabin under both idling and operating speed conditions of the power plant from which the system is driven.

Further objects and advantages of the invention will be brought out in the following part of the specification wherein I have, for the purpose of completeness of disclosure, explained the invention in close detail, without limiting the scope of the invention defined in the appended claims.

Referring to the drawing, which is for illustrative purposes only:

Figure 1:
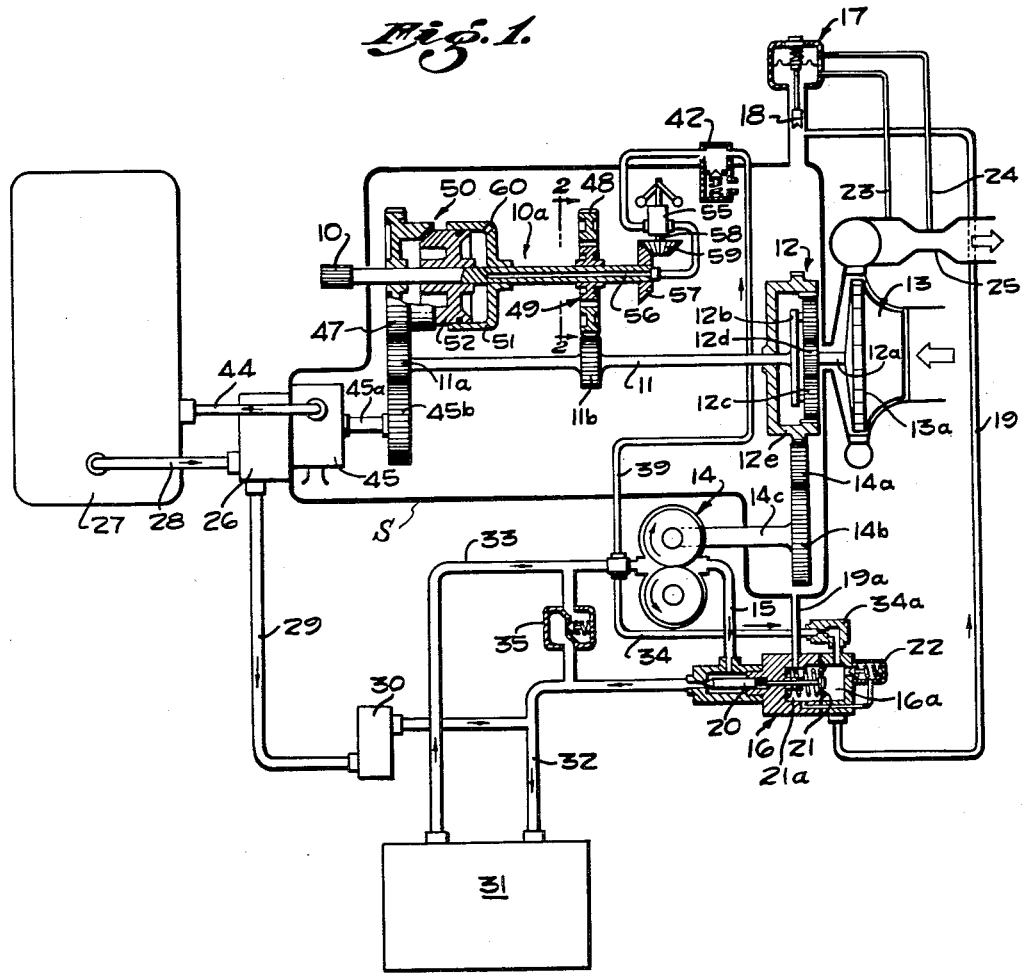
Fig. 1 is a schematic view showing the system connected to supercharger.
Figure 2:
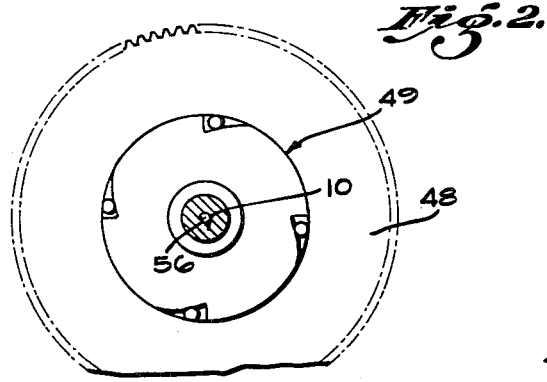
Fig. 2 is a sectional view taken as indicated by the line 2—2 of Fig. 1.

As shown in Fig. 1, my system provides a shaft 10 arranged to be connected to an engine so as to be driven thereby. This shaft 10 is connected through a variable-ratio transmission 10a with a shaft 11 comprising the power input of a second variable-ratio transmission 12 having a power output shaft 12a connected to the impeller 13a of a supercharger 13.

The variable-ratio transmission 12 is of the type comprising a differential gear of planetary type and a reactor pump 14 having a discharge passage 15 and a valve 16 for throttling the discharge flow from the pump 14. The transmission 12 has a spider 12b supporting planet gears 12c which engage a sun gear 12d fixed on the shaft 12a, and also engage a ring gear 12e, rotation of which ring gear 12e is controlled by the reactor pump 14 through an idler gear 14a which connects the ring gear 12e with the gear 14b fixed on the shaft 14c of the pump 14 which is shown as a gear pump.

The throttle valve 16 is controlled in accordance with variations in a condition resulting from the rotation of the supercharger impeller 13a. It is contemplated that the valve 16 may be controlled by cabin pressure, maintained by air delivered from the supercharger 13. The present system employs a control for the variable-ratio transmission 12 which responds to flow of air through a path which leads to the cabin, and in which path the supercharger 13 is placed, and also a venturi 25 which is connected through ducts 23 and 24 respectively with the lower and upper portions of the diaphragm chamber of a pilot valve 17 having a valve member 18 which controls discharge of oil from the valve 16 through a duct 19.

The invention includes a hydraulic system which has a supply pump 26 arranged to draw oil from a reservoir 27 through piping 28. This oil is delivered under pressure through piping 29 and a micronic type filter 30 to an oil circulating system associated with the pump 14 and the valve 16. This circulating system includes an oil cooler 31 which receives fluid from the valve 16 through piping 32 and delivers the oil in cooled condition to the inlet of the pump 14 through piping 33. Through a branch pipe 34 and a restricting orifice 34a, oil under pressure is conducted from the pipe 33 to the oil chamber 16a which exists above the diaphragm 21 of the valve device 16, this diaphragm 21 being connected to the needle valve 20 so as to move the same into a position to close the discharge passage 15 in response to the build up of pressure in the chamber 16a. A pressure relief valve 35 connects the piping 32 with the piping 33 so that excess oil pressure in the piping 32 may be released into the pipe 33 which communicates with the inlet of the pump 14. Branch piping 39 also extends from the piping 33 for distribution of oil under pressure as will be hereinafter explained and the maximum pressure of oil in the piping 39 is limited by a thereto connected relief valve 42, the outlet of which is connected to the interior of the shell S which houses the transmissions 10a and 12. Oil which accumulates in the shell S which encloses the variable-ratio transmission equipment is returned through piping 44 to the reservoir 27 by a scavenger pump 45. The pumps 26 and 45 are driven by a common shaft 45a rotated by means of a gear 45b driven by a gear 11a fixed on the leftward end of the shaft 11.

The variable-ratio transmission 10a includes a gear 47 which is rotatable on the shaft 10 and is enmeshed with the gear 11a, and a smaller gear 48 which is supported on the shaft 10 by an over-running or free wheeling clutch 49 and meshes with a gear 11b which is also fixed on the shaft 11.

A clutch mechanism 50 is provided for selectively connecting the gear 47 to shaft 10. The schematically shown clutch means 50 includes an annular cylinder 51 and a piston 52 for its actuation. When the clutch means 50 is disengaged, as shown in Fig. 1, shaft 10 will drive shaft 11 through the over-running clutch 49 and gears 48 and 11b, but when fluid under pressure is delivered into the cylinder 51 so as to engage the clutch means 50, the gear 47 will be driven and the shaft 11 will be then rotated at a speed greater than that at which it can be rotated through the gear 48 which will then rotate around the free wheeling clutch 49.

When the engine is operating under normal power conditions, for example when the aircraft is in flight, the shaft 10 will be driven at relatively high speed and the transmission 10a will drive the shaft 11 through the gear 48. When the engine is operating within a low speed range, for example idling while the aircraft is standing on the ground, the tranmission 10a is controlled so as to drive the shaft 11 at a higher speed ratio through the gear 47 so as to maintain the speed of the shaft 11 within a reasonable operating range even though the engine speed has been reduced to low value under idling conditions. The control means which I provide for this purpose comprises a valve device 55 which is responsive to changes in the speed of a part which is driven by the engine. This valve 55 is connected in series with the oil duct 39 and the cylinder 51 and is adapted to feed oil under pressure through an axial duct 56 in the shaft 10 to the cylinder 51 when the speed of rotation of the shaft 10 is that which exists when the engine is idling. To operate the velocity responsive valve device 55 a gear 57, mounted on the shaft 10, is arranged to drive the operating shaft 58 of the valve device 55 through a gear 59. The cylinder 51 is provided with a bleed orifice 60 through which oil pressure may escape from the cylinder 51 when the valve device 55 closes as a result of increasing the speed of the shaft 10 to that at which it is driven when the engine is operating under power delivery conditions, for example during aircraft flight.

When the device is inactive as the result of the engine being stopped, low oil pressure will exist in the oil circulating system and the pressure in the hydraulic chamber 16a of the valve 16 will be so low that the closure member 20 thereof will be in open position and there will be no restriction of the discharge 15 of the pump 14. Therefore, when the engine is started and shaft 11 is driven, the ring gear 12c may rotate relatively freely. That is to say, the variable ratio transmission 12 will be at its lowest driving speed ratio and the impeller 13a of the supercharger 13 will not be forced to start rotation abruptly at high speed. Thereafter, as the operation of the pump 26 builds up pressure in the oil circulating system, oil under pressure will flow through the piping 34 and the restricting orifice 34a into the chamber 16a, building up the pressure against the diaphragm 21 so as to gradually close the valve 16 and gradually increase the speed of rotation of the impeller 13a to its proper speed of rotation determined by the flow of air through the venturi 25 which in turn controls the valve device 17. To prevent overspeeding of the supercharger, I provide pressure limiting valve 22 connecting the chamber 16a of the valve 16 with the spring chamber 21a, on the opposite side of the diaphragm 21, which chamber 21a is connected through a duct 19a with the interior of the casing S.

Substantially simultaneously with the foregoing the hydraulic pressure will be built up through the piping 39, the valve device 55 and in the cylinder 51 to actuate the clutch means 50 so as to drive the high-speed ratio gear 47 of the variable ratio transmission 10a, to increase the speed of the shaft 11. Thereafter, when the engine is operated under power delivery conditions, the increased engine speed will be transmitted to the shaft 10 and through the shaft 10 to the velocity responsive valve device 55 which will immediately close and shut off the flow of oil to the cylinder 51. Pressure will bleed from the cylinder 51 through the orifice 60 and the clutch device 50 will be inactivated and the transmission 10a will thereafter drive the shaft 11 through its low driving speed ratio gear 48.

I claim as my invention:

1. In a system for driving a supercharger: a variable speed transmission having a power output for connection to said supercharger, and a power input member adapted to be rotatively driven; control means to regulate said transmission so as to obtain a desired operation of said supercharger; a power driven member; a variable ratio drive connecting said power driven member and said power input member of said variable speed transmission and being operable to effect between said power driven member and said input member a high speed driving ratio and a low speed driving ratio; and control means acting in response to rotation of said power driven member at low speed to adjust said variable ratio drive to said high speed driving ratio and acting in response to rotation of said power driven member at high speed to adjust said variable ratio drive to said low speed drive ratio.

2. In a system for driving a supercharger: a variable speed transmission having a power output for connection to said supercharger, and a power input member adapted to be rotatively driven; control means to regulate said transmission so as to obtain a desired operation of said supercharger; a power driven member adapted to be driven by a power source at speeds of rotation within high speed and low speed ranges; a variable ratio drive connecting said power driven member and said power input member of said variable speed transmission and being operable to effect between said power driven member and said input member a high speed driving ratio and a low speed driving ratio; and control means acting in response to rotation of said power driven member in said low speed range to adjust said variable ratio drive to said high speed driving ratio and acting in response to rotation of said power driven member in said high speed range to adjust said variable ratio drive to said low speed drive ratio.

3. In a system for driving, from an engine with a high speed operating range and a low speed idling range, a supercharger which supplies air to an enclosure of an aircraft: a variable speed transmission having a power output for connection to said supercharger, and a power input member adapted to be rotatively driven; control means responding to air which has been delivered by said supercharger to regulate said transmission so as to obtain a desired operation of said supercharger; a power driven member for connection to said engine so as to be driven thereby at high speed when the engine is operating and at low speed when the engine is idling; a variable ratio drive connecting said power driven member and said power input member of said variable speed transmission and being operable to effect between said power driven member and said input member a high speed driving ratio and a low speed driving ratio; and control means acting in response to rotation of said power driven member at low speed to adjust said variable ratio drive to said high speed driving ratio and acting in response to rotation of said power driven member at high speed to adjust said variable ratio drive to said low speed drive ratio.

4. In a system for driving, from an engine with a high speed operating range and a low speed idling range, a supercharger which supplies air to an enclosure of an aircraft: a variable speed transmission having a power output for connection to said supercharger, and a power input member adapted to be rotatively driven; control means responding to air which has been delivered by said supercharger to regulate said transmission so as to obtain a desired operation of said supercharger; a power driven member for connection to said engine so as to be driven in a low speed range when said engine is idling and in a high speed range when said engine is operating; a variable ratio drive connecting said power driven member and said power input member of said variable speed transmission and being operable to effect between said power driven member and said input member a high speed driving ratio and a low speed driving ratio; and control means acting in response to rotation of said power driven member in said low speed range to adjust said variable ratio drive to said high speed driving ratio and acting in response to rotation of said power driven member in said high speed range to adjust said variable ratio drive to said low speed drive ratio.

5. In a system for driving, from an engine with a high speed operating range and a low speed idling range, a supercharger which supplies air to an enclosure of an aircraft: a variable speed transmission having a power output for connection to said supercharger, and a power input member adapted to be rotatively driven said transmission comprising a differential gear and a reaction pump connected so as to control the speed of said power output; control means responding to air which has been delivered by said supercharger to regulate said transmission so as to obtain a desired operation of said supercharger, comprising a valve restraining the outlet of said pump, a venturi through which said air passes and means responsive to the speed of the air through said venturi to adjust said valve; a power driven member for connection to said engine so as to be driven in a low speed range when said engine is idling and in a high speed range when said engine is operating; a variable ratio drive connecting said power driven member and said power input member of said variable speed transmission and being operable to effect between said power driven member and said input member a high speed driving ratio and a low speed driving ratio; and control means acting in response to rotation of said power driving member in said low speed range to adjust said variable ratio drive to said high speed driving ratio and acting in response to rotation of said power driven member in said high speed range to adjust said variable ratio drive to said low speed drive ratio, thereby maintaining a speed of rotation of said power input member of said variable speed transmission within a safe range.

6. In a system for driving a supercharger from a power plant having a part which has one movement when the power plant is operating at driving speed and another movement when the power plant is idling: a variable speed transmission incorporating control means and having a power output member for connection to said supercharger and parts which move during the operation thereof; a first rotatable part adapted to be driven by said power plant; a second rotatable part connected to said variable speed transmission so as to drive the same from said power plant; a variable ratio drive connecting said first and second rotatable parts; and control means for said variable ratio drive connected for control to said part of said power plant and operating to increase the driving speed ratio of said variable ratio drive when said power plant is idling and decrease the driving speed ratio of said variable ratio drive when said power plant is operating at driving speed.

7. In a system for driving a supercharger from a power plant having a part which has one movement when the power plant is operating at driving speed and another movement when the power plant is idling: a variable speed transmission incorporating control means and having a power output member for connection to said supercharger and parts which move during the operation thereof; a first rotatable part adapted to be driven by said power plant; a second rotatable part connected to said variable speed transmission so as to drive the same from said power plant; a variable ratio drive connecting said first and second rotatable parts; and control means for said variable ratio drive operating in response to movement of one of said parts to increase the driving speed ratio of said variable ratio drive when said power plant is idling and decrease the driving speed ratio of said variable ratio drive when said power plant is operating at driving speed.

8. In a system for driving a supercharger from a power plant having a part which has one movement when the power plant is operating at driving speed and another movement when the power plant is idling; a variable speed transmission incorporating control means and having a power output member for connection to said supercharger and parts which move during the operation thereof; a first rotatable part adapted to be driven by said power plant; a second rotatable part connected to said variable speed transmission so as to drive the same from said power plant; a variable ratio drive connecting said first and second rotatable parts; a rotatable control member connected so as to be driven by one of said parts and having velocity responsive means which resides in a first position when it is rotated at high velocity and moves to a second position when it is rotated at low velocity; and means responsive to movement of said velocity responsive means from one of its said positions to the other to change the driving speed ratio of said variable ratio drive.

9. In a system for driving a supercharger from a power plant having a part which has one movement when the power plant is operating at driving speed and another movement when the power plant is idling: a variable speed transmission incorporating control means and having a power output member for connection to said supercharger and parts which move during the operation thereof; a first rotatable part adapted to be driven by said power plant; a second rotatable part connected to said variable speed transmission so as to drive the same from said power plant; a variable ratio drive connecting said first and second rotatable parts; a control member arranged for movement back and forth between first and second positions in cooperative relation to the increase and decrease in the speed of said power plant; and means responsive to movement of said control member from one of its positions to the other to change the driving speed ratio of said variable ratio drive.

10. In a system for driving a supercharger from an engine of an aircraft: a first variable speed transmission having its input connected to the engine; a second variable speed transmission having its input connected to the output of said first transmission and its output connected to the supercharger; a control means responsive to change in speed of said engine and operating to vary the driving ratio of said first transmission; and a second control means responsive to a variable of the fluid discharge of said supercharger and operating to vary the driving ratio of said second transmission.

11. In a system for driving a supercharger from an engine of an aircraft: a first variable speed transmission having its input connected to the engine; a second variable speed transmission having its input connected to the output of said first trasmission and its output connected to the supercharger: a control means responsive to increase and decrease in the speed of said engine so as to decrease and increase the driving speed ratio of said first transmission; and a second control means responsive to increase and decrease in the fluid delivered by said supercharger so as to decrease and increase the driving speed ratio of said second transmission.

12. A system as defined in claim 11 wherein the first named control means has parts utilizing fluid pressure to increase the driving speed ratio of said first transmission, said system also having means which minimizes said fluid pressure when the power input to the system is stopped.

13. A system as defined in claim 11 wherein said control means both utilize fluid pressure to increase the driving speed ratios of said first and second transmissions, said system having means which minimizes said fluid pressure when operation of the system is stopped and gradually increases said fluid pressure when operation of the system is started.

14. In a system for driving a supercharger from a power plant operable at high and low speeds; a variable speed transmission incorporating control means and having a power output member for connection to said supercharger; a first rotatable part adapted to be driven by said power plant; a second rotatable part connected to said variable speed transmission so as to drive the same; a variable ratio drive connecting said first and second rotatable parts; and control means responsive to the speed of rotation of said first rotatable part and operable to selectively increase and decrease the driving speed ratio of said variable ratio drive.

15. In a system for driving, from an engine with a high speed operating range and a low speed idling range, a supercharger which supplies air to an enclosure of an aircraft: a variable speed transmission having a power output for connection to said supercharger, and a power input member adapted to be rotatively driven; control means responding to air which has been delivered by said supercharger to regulate said transmission so as to obtain a desired operation of said supercharger; a power driven member for connection to said engine so as to be driven thereby at high speed when the engine is operating and at low speed when the engine is idling; a variable ratio drive connecting said power driven member and said power input member of said variable speed transmission and being operable to effect between said power driven member and said input member a high speed driving ratio and a low speed driving ratio; and control means operative to adjust said variable ratio drive selectively to high speed and low speed driving ratios.

References Cited in the file of this patent

UNITED STATES PATENTS

| | | |
|---|---|---|
| 2,400,307 | Hobbs et al. | May 14, 1946 |
| 2,403,381 | Lawrence | July 2, 1946 |
| 2,485,126 | Wood | Oct. 18, 1949 |